United States Patent Office 3,422,618
Patented Jan. 21, 1969

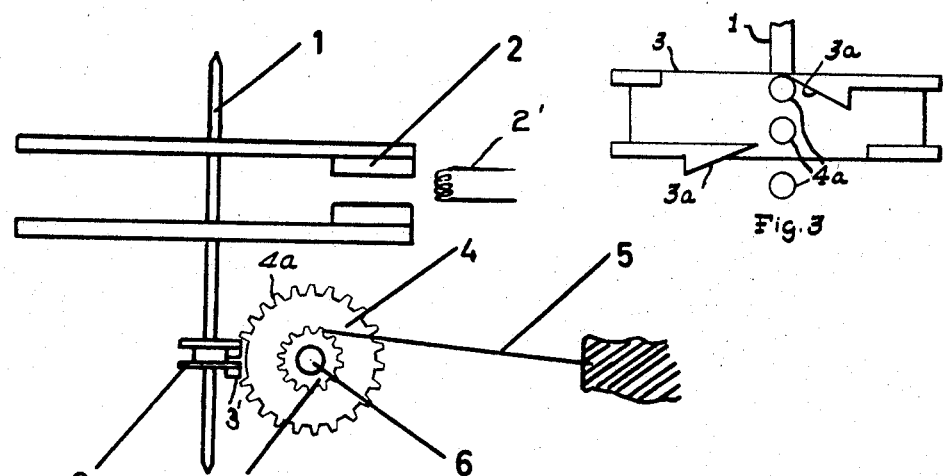
Fig. 3
Fig. 1
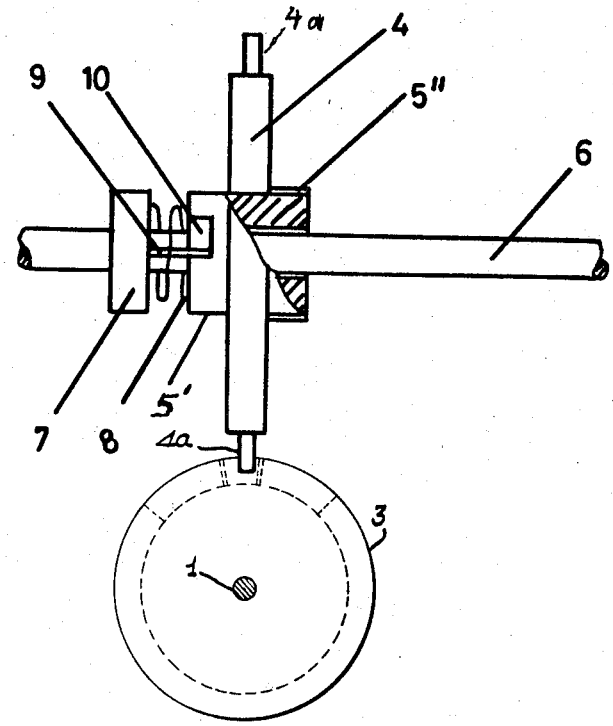
Fig. 2

3,422,618
POINTER-WORK DRIVE IN CLOCKS HAVING DIRECTLY DRIVEN OSCILLATOR SYSTEMS
Albrecht Haag, Seebuckweg, Germany, assignor to Kienzle Uhrenfabriken G.m.b.H., Schwenningen am Neckar, Germany, a limited-liability company of Germany
Filed Oct. 17, 1966, Ser. No. 587,331
Claims priority, application Germany, Oct. 16, 1965, K 57,412
U.S. Cl. 58—28          4 Claims
Int. Cl. G04c 3/04

ABSTRACT OF THE DISCLOSURE

An electric clock having an oscillator for intermittently driving a time works spindle through a stepping wheel is provided with a resilient coupling between the spindle carrying the wheel to reduce inertia effects on the wheel due to a mass which may be the spindle or whose effect is transmitted thereto.

---

In electric clocks wherein a rotary oscillator is directly driven by electromagnetic means there has been a problem in the use of hands or pointers. In particular, only a comparatively small or lightweight pointer could hitherto be used for a central seconds hand. With increased pointer lengths it was necessary that the oscillator had a greater moment of inertia in order that the influence of the pointer on the amplitude and the speed of the oscillator remain nil. A greater moment of inertia of the oscillator system, however, required greater mass for the oscillator and increased its need for space—a disadvantage that could be only unwillingly accepted. It was heretofore then necessary to hold the moment of inertia of the pointer as minute as possible and make the moment of inertia of the oscillator as great as possible.

In spite of those restrictions the influence on the oscillator, especially when a central seconds hand was used, was comparatively large. That is to say, the design or arrangement led to a detectable decrease in amplitude of the oscillator and an attendant effect on the speed when a central seconds hand was used. Even when, for example, an efficient eddy current brake was employed on the oscillator or balance at amplitude over 180°, which operated so that a large power-loss resulted, the additional power-loss due to a central seconds hand had yet an additional influence on the speed.

An object of the present invention is to minimize the above disadvantages, that is to say that in clocks having a directly driven oscillatory system, the use of large pointers, especially central seconds pointers, should be made possible without an unduly great effect on the oscillator or balance.

This object is attained in a construction wherein a stepping wheel which is directly driven by the balance is connected to the stepping wheel spindle through a spring, the stepping wheel having a pawl bearing on a part of it to prevent back-turn.

If the driven spindle in the time work train is coupled to the stepping wheel by means of a rigid link member, the inertia moment of the total arrangement, including the pointer, reacts for the time being against the oscillator at each forward impulse given to the stepping wheel by the oscillator. The oscillator, or balance, must then perform in a geometrically fixed oscillation path, the work of accelerating the components in the work train during a relatively short time. The greater the inertia of the work train the greater is the effect on the amplitude of the oscillator or balance.

On the other hand, if the elastic spring is interposed between the stepping wheel and its shaft, only the work of deforming the spring need be drawn from the oscillator. If the link containing the spring is properly tuned the reverse acting moment of inertia of the stepping wheel alone is of very slight effect on the balance. The hand works are not actually advanced until the timely long phase between two motion increments of the stepping wheel, both due to the tensed intermediate spring unwinding with acceleration. The intermediate spring can be so tuned that a procession of the work train is produced in increments of equal amount. The influence on the balance therefore remains very small and practically independent of the value of the moment of inertia of the following connected hand works, including hands, up to a certain upper limit which depends on the particular construction involved.

The above arrangement is useful in stepping devices having a sprocket on the balance staff to actuate a stepping wheel and also in such devices having an anchor or verge actuated by an oscillator and engaging with a stepping wheel. In the latter device no additional means, such as a pawl, need be provided to prevent backturn since the anchor cooperates with the stepping wheel to perform that function.

There are indirectly driven oscillators or escapement devices known wherein there is an elastic coupling between the pallet wheel and its arbor. But this coupling is in the power train, that is, between the energy source and the balance staff. There the inertia of the seconds hand does not affect the action of the balance to any appreciable extent because there is usually much more than ample energy at the source and action of the pallets is quite different in relation to the power source from the action of the steppers in the present invention.

An example of the invention is shown schematically in the drawing wherein

FIG. 1 shows a plan of the overall combination;
FIG. 2 shows a front elevation, and
FIG. 3 diagrammatically shows the driving means for the stepping wheel.

The numeral 1 designates a balance wheel staff on which a balance wheel 2, oscillated by intermittently energized electromagnetic means 2' is fixed. The balance staff 1 carries fast thereon steppers 3 having camming elements 3' to engage with teeth 4a extending about the periphery of a stepping wheel 4 (though for clarity the teeth are shown on only one quadrant in FIG. 1). Oscillation of the balance wheel 2 imparts progressive movement to the stepping wheel by rotation by rhythmic increments, one increment for each half swing of the balance.

The stepping wheel is mounted on a spindle 6 so as to be able to turn with respect to the spindle, but is coupled to the spindle through a helical or spiral spring 8 having its respective ends secured to a part 7 such as a wheel or collar 7 fast on the spindle and to a hub portion 5' of the stepping wheel. The hub portion is provided with a set of fine ratchet teeth 5'' for cooperating with a pawl blade 5 to prevent reverse movement of the stepping wheel. On the part 7, which also is to some degree an inertia body and schematically represents, qualitatively, the inertia of the seconds hand, there is also a pin 9 which engages loosely in a recess 10 in the stepping wheel hub so that there is a degree of relative movement between the stepping wheel and its spindle. The engagement of the pin in the recess prevents full unwinding of the spring and moreover fixes the maximum possible movement of the spring. This maximum possible movement is, however, less than the spring excursion met with in reality in the usual use of such a spring. Naturally, means are provided which fix the position of the stepping wheel in the axial direction.

In the case of a rigid connection between the stepping wheel and the spindle on which it is mounted, the central seconds hand or pointer and the works become accelerated during a short time interval $t_1$. The work done $A_1$ is expressed by the equation:

$$A_1 = K t_1^{-2}$$

When an elastic coupling is employed between the stepping wheel and its spindle, the seconds hand and the works are accelerated over a long time $t_2$. The work done $A_2$ here is similarly related to time by the equation $$A_2 = K t_2^{-2}$$

The work ratio can then be expressed as $$\frac{A_2}{A_1} = \frac{t_1^2}{t_2^2}$$

Since $t_2$ is greater than $t_1$, $A_2$ is much less than $A_1$ because of the second power relationship and so the interposition of the spring between the stepping wheel and its spindle enables much less work by the oscillator than if a rigid connection is used as has been done up to the present time.

Springs can be obtained with only minute histeresis loss during their partial coiling and uncoiling. The energy stored in the spring by the advancement of the stepping wheel is thus available over a comparatively long time interval to drive the work train and its central seconds hand, which may be mounted on the spindle 6. The stored energy permits quite gradual acceleration of a large and comparatively massive seconds hand, so that the movement of the hand is really substantially of the nature of running at constant speed, with no more force being applied intermittently than is necessary to overcome frictional forces.

The invention claimed is:

1. An electric clockwork comprising a time train drive spindle for the clockwork, a toothed stepping wheel mounted on the spindle for turning with respect thereto, pawl means on a portion of the wheel to substantially prevent turning of the wheel in one direction, an oscillator and electro-magnetic means cooperating electro-magnetically therewith to oscillate the oscillator, at least one stepper member on the oscillator for engaging the teeth of the stepping wheel to intermittently advance the stepping wheel oppositely from said one direction, and elastic means coupling the stepping wheel to the spindle whereby a sudden advance of the stepping wheel by the stepper against inertia in the time train will deform the elastic means and store energy therein for exerting a driving force on the spindle subsequent to the advance of the stepping wheel.

2. A clockwork as claimed in claim 1, said elastic coupling means being a coiled spring about the spindle and attached to the stepping wheel and spindle.

3. A clockwork as claimed in claim 1, and additional means for restricting the amount of turning of the stepping wheel with respect to the spindle when the elastic means is deformed.

4. A clockwork as claimed in claim 2, and means for limiting the relative turning of the stepping wheel on the spindle, the spring constant of the spring, the limits of relative turning of the stepping wheel on the spindle, and the effective reactive moment of inertia on the spindle being so related that the spindle does not materially turn until the stepper member has cleared a tooth of the stepping wheel during driving of the spindle by the stepper member through the stepping wheel and spring.

References Cited

UNITED STATES PATENTS

| 2,757,545 | 10/1956 | Ensign et al. | 58—28 |
| 2,920,439 | 1/1960 | Rich | 58—28 |

FOREIGN PATENTS

| 848,032 | 7/1939 | France. |
| 1,359,658 | 3/1964 | France. |

STEPHEN J. TOMSKY, *Primary Examiner.*

EDITH C. SIMMONS, *Assistant Examiner.*

U.S. Cl. X.R.

58—23